United States Patent
Inaba et al.

(10) Patent No.: US 7,536,869 B2
(45) Date of Patent: May 26, 2009

(54) VAPOR COMPRESSION REFRIGERATING APPARATUS

(75) Inventors: Atsushi Inaba, Kariya (JP); Yasushi Yamanaka, Inazawa (JP); Koichi Ban, Tokai (JP); Takashi Yamanaka, Kariya (JP)

(73) Assignee: Denso Corporation, Kariya (JP)

( * ) Notice: Subject to any disclaimer, the term of this patent is extended or adjusted under 35 U.S.C. 154(b) by 540 days.

(21) Appl. No.: 11/252,274

(22) Filed: Oct. 17, 2005

(65) Prior Publication Data

US 2006/0080985 A1    Apr. 20, 2006

(30) Foreign Application Priority Data

Oct. 19, 2004    (JP)    ............... 2004-304840

(51) Int. Cl.
*F25B 27/02*    (2006.01)
(52) U.S. Cl. ........................ 62/238.6; 62/332
(58) Field of Classification Search ............ 62/172, 62/236, 238.6–238.7, 331–333, 323.1, 506–507, 62/509
See application file for complete search history.

(56) References Cited

U.S. PATENT DOCUMENTS

| | | | | |
|---|---|---|---|---|
| 4,178,989 A | * | 12/1979 | Takeshita et al. | 165/62 |
| 4,526,013 A | * | 7/1985 | Joy | 62/236 |
| 4,694,662 A | * | 9/1987 | Adams | 62/509 |
| 5,584,190 A | * | 12/1996 | Cole | 62/260 |
| 5,761,921 A | * | 6/1998 | Hori et al. | 62/238.4 |
| 7,178,358 B2 | * | 2/2007 | Inaba et al. | 62/498 |
| 2004/0216483 A1 | | 11/2004 | Inaba et al. | |
| 2006/0026981 A1 | | 2/2006 | Inaba et al. | |

FOREIGN PATENT DOCUMENTS

| | | |
|---|---|---|
| JP | 2540738 | 7/1996 |
| JP | 2001-301438 | 10/2001 |
| JP | 2005-001922 | 1/2005 |
| JP | 2005325746 A * | 11/2005 |

OTHER PUBLICATIONS

U.S. Appl. No. 11/325,648, filed Jan. 4, 2006, Inaba et al.

\* cited by examiner

*Primary Examiner*—William E Tapolcai
(74) *Attorney, Agent, or Firm*—Harness, Dickey & Pierce, PLC (57) ABSTRACT

A vapor compression refrigerating apparatus comprises a refrigerating cycle for performing a cooling operation of an automotive air conditioning system, a Rankine cycle for collecting waste heat from an engine of a vehicle to generate an electric power by an electric rotating device driven by an expansion device of the Rankine cycle, and a heat pump cycle for generating heat to supply the generated heat to the engine so that a warming up operation of the engine can be facilitated.

11 Claims, 5 Drawing Sheets

VAPOR COMPRESSION REFRIGERATING APPARATUS

CROSS REFERENCE TO RELATED APPLICATION

This application is based on Japanese Patent Application No. 2004-304840, which is filed on Oct. 19, 2004, the disclosure of which is incorporated herein by reference.

FIELD OF THE INVENTION

The present invention relates to a vapor compression refrigerating apparatus having Rankine cycle for collecting driving force by use of waste heat from a heat generating device, and a heat pump cycle for heating the heat generating device, and in particular relates to a vapor compression refrigerating apparatus to be applied to an automotive air conditioning system.

BACKGROUND OF THE INVENTION

In a conventional vapor compression refrigerating apparatus, for example, as disclosed in Japanese Patent No. 2540738, a component (a condenser) of a refrigerating cycle is commonly used to form Rankine cycle, waste heat of an automotive engine (a heat generating device) is collected as driving force by an expansion device, which is commonly used as a compressor device, and the collected driving force is applied (returned) to the engine.

The waste heat of the engine is also used as a heating source for a heating operation, by supplying the waste heat to a heater of a heater circuit.

An operating rate of an engine is set at a lower value, when a hybrid vehicle, which has been becoming popular in recent years, is running at a low speed. As a heat amount (waste heat) generated in the engine is small, it is a problem in that a sufficient amount of the waste heat, in particular in a winter season, can not be supplied from the engine to the heater as the heating source. It is, therefore, necessary to operate the engine at the low speed running of the hybrid vehicle in order to obtain the heating source for the heater, even at sacrifice of a fuel consumption ratio.

In an ordinary vehicle, an amount of waste heat from the engine becomes smaller, as a result of developments for high-efficiency engines. A similar problem, in running short of the heating source for the heater, occurs in the ordinary vehicle, as in the hybrid vehicle. In the ordinary vehicle, for example, a PTC heater is provided to make up a deficit of the heat energy. However, such a device is high in cost.

SUMMARY OF THE INVENTION

The present invention is made in view of the above problems. It is, therefore, an object of the present invention to provide a vapor compression refrigerating apparatus, which comprises Rankine cycle for effectively making use of waste heat from a heat generating apparatus, wherein it is also possible to generate heat when the amount of the waste heat from the heat generating apparatus is small, and to make up a deficit of the heat energy for such devices which are ordinarily operated by the waste heat.

According to a feature of the present invention, a vapor compression refrigerating apparatus comprises; a refrigerating cycle having a compressor device, a condenser device, a depressurizing device, and an evaporator, wherein refrigerant is circulated in the refrigerating cycle to perform a cooling operation; a Rankine cycle having a pump for pumping out the refrigerant, a heating device for heating the refrigerant by use of waste heat from a heat generating device, an expansion device, and the condenser device, wherein the refrigerant is circulated in the Rankine cycle to generate a driving force at the expansion device by expansion of the refrigerant heated by the heating device; and a heat pump cycle having a pump bypass passage bypassing the pump and an orifice provided in the pump bypass passage. In the above vapor compression apparatus, the refrigerant is circulated from the compressor device through the heating device, the pump bypass passage and the condenser device to perform a heat absorbing operation at the condenser device and to perform a heating operation at the heating device, so that the heat generating device is heated by the heating operation at the heating device.

According to another feature of the present invention, a vapor compression refrigerating apparatus for an automotive vehicle comprises a hot water circuit for circulating engine cooling water to cool down an engine of the automotive vehicle, the hot water circuit having a water pump for circulating the engine cooling water, a radiator for radiating heat from the engine cooling water to outside air, and a heater core for an automotive air conditioning system through which the engine cooling water flows. The apparatus further comprises a refrigerating cycle for the automotive air conditioning system, the refrigerating cycle having a compressor device, a condenser device, a gas-liquid separator, an evaporator and an accumulator to form a refrigerant passage of the refrigerating cycle. The apparatus further comprises a heating device provided in both of the hot water circuit and the refrigerant passage of the refrigerating cycle, so that the high pressure and high temperature refrigerant compressed by the compressor device flows through the heating device to heat the engine cooling water, when the engine cooling water is at a low temperature.

According to a further feature of the present invention, the above vapor compression refrigerating apparatus comprises a Rankine cycle for collecting waste heat from the engine, the Rankine cycle having the heating device, an expansion device, a second bypass passage, a switching valve, the condenser device, a liquid pump for circulating the refrigerant in the Rankine cycle, a first bypass passage, to form a refrigerant passage for the Rankine cycle. The apparatus further has an electric rotating device operatively connected to the expansion device. In the above apparatus, an inlet side of the condenser device is communicated with an outlet side of the expansion device by a switching operation of the switching valve, whereas an outlet side of the condenser device is communicated with an inlet side of the heating device through the first bypass passage when the Rankine cycle is in its operation, and the refrigerant is heated at the heating device and superheated refrigerant is supplied into the expansion device, so that the refrigerant is expanded in the expansion device to generate a driving force to rotate the electric rotating device.

According to a further feature of the present invention, the above vapor compression refrigerating apparatus further comprises a heat pump cycle having the compressor device, the heating device, the first bypass passage, a pump bypass passage, an ON-OFF valve provided in the pump bypass passage and opening the pump bypass passage when the heat pump cycle is in its operation, an orifice provided in the pump bypass passage for restricting a flow passage thereof, the condenser device, the switching valve, the second bypass passage, and the accumulator, to form a refrigerant passage for the heat pump cycle. In the above apparatus, an outlet side of the condenser device is communicated with the inlet side of the compressor device by the switching operation of the switching valve, whereas an inlet side of the condenser device is communicated with an outlet side of the heating device through the pump bypass passage and the first bypass passage when the heat pump cycle is in its operation, and the high pressure and high temperature refrigerant compressed by the compressor device flows through the heating device to heat the engine cooling water, when the engine cooling water is at a low temperature.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
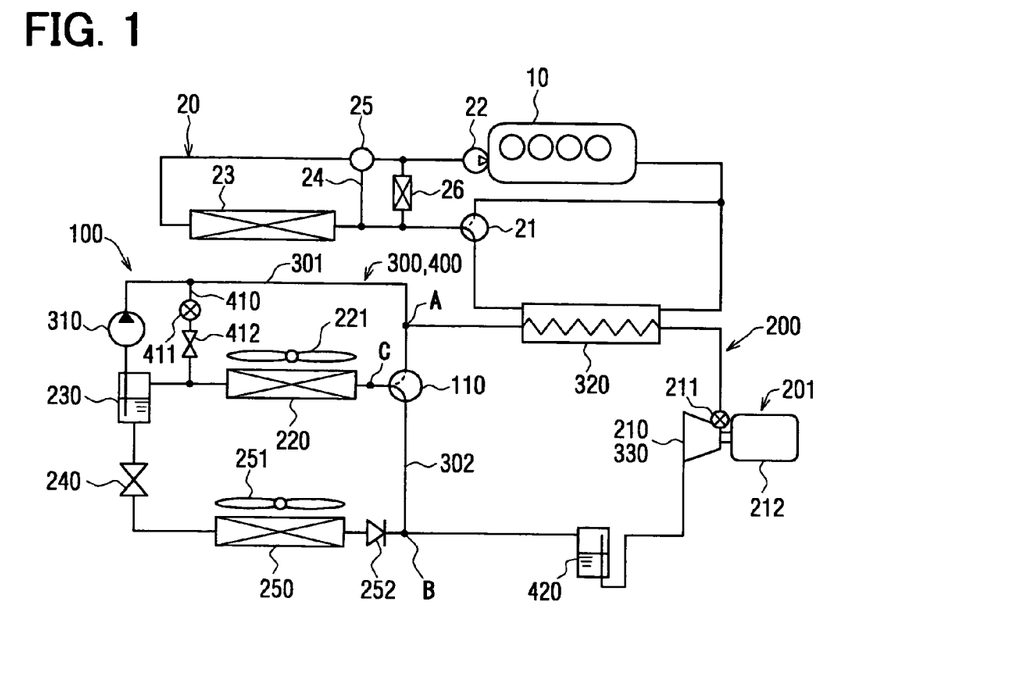
FIG. 1 is a schematic view showing a system structure of a vapor compression refrigerating apparatus according to a first embodiment of the present invention.

A first embodiment of the present invention is a vapor compression refrigerating apparatus 100, which is applied to a water cool type engine 10 (an internal combustion engine). The engine 10 corresponds to a heat generating apparatus generating waste heat as a result of controlling an operational temperature of the heat generating apparatus.

The vapor compression refrigerating apparatus 100 (hereinafter, simply referred to as the refrigerating apparatus) comprises a well known refrigerating cycle 200, into which Rankine cycle 300 and a heat pump cycle 400 are incorporated.

A compressor device 210 is provided in the refrigerating cycle 200, for sucking refrigerant and compressing the same to high temperature and high pressure refrigerant, wherein the compressor device 210 is formed as an expansion-compressor device 201, which is also used as an expansion device 330 for the Rankine cycle 300. The compressor device 210 (the expansion device 330) is, for example, constructed as a scroll type fluid machine, and a control valve 211 is provided at a high pressure side of the expansion-compressor device 201. The control valve 211 switches over the operational modes of the expansion-compressor device 201, wherein the control valve 211 is operated as a discharge valve (a check valve) when the device 201 is operated as the compressor device 210 (an operation with a forward rotation), whereas the control valve 211 is operated as a valve for opening a refrigerant passage of a high pressure side when the device 201 is operated as the expansion device 330 (an operation with a reversed rotation). An electric rotating device 212, which has both functions of an electric power generator and an electric motor, is connected to the expansion-compressor device 201 (the compressor device 210, the expansion device 330).

A condenser 220 (also referred to as a condenser device) is provided at a discharge side of the compressor device 210 for cooling down the high temperature and high pressure refrigerant to condense (liquidize) the same. A condenser fan 221 blows cooling air (outside air) toward the condenser 220.

A gas-liquid separator 230 is a receiver for separating the refrigerant (which is condensed at the condenser 220) into a gas phase refrigerant and a liquid phase refrigerant, to flow out the liquid phase refrigerant. A depressurizing device 240 is a temperature dependent type expansion valve for depressurizing and expanding the liquid phase refrigerant separated at the gas-liquid separator 230, wherein an opening degree of the valve is controlled so that the refrigerant is depressurized in an isenthalpic manner and that superheated degree of the refrigerant to be sucked into the compressor device 210 is controlled at a predetermined value.

An evaporator 250 is a heat exchanger for performing a heat absorbing operation by evaporating the refrigerant depressurized by the depressurizing device 240, to cool down air outside of a vehicle (the outside air) or air inside of the vehicle (the inside air), which is blown into a passenger room of a vehicle through the evaporator 250 by a fan 251. A check valve 252 is provided at a refrigerant outlet side of the evaporator 250, for allowing the refrigerant to flow only from the evaporator 250 to the compressor device 210.

The above compressor device 210, the condenser 220, the gas-liquid separator 230, the depressurizing device 240 and the evaporator 250 form the refrigerating cycle 200, for transferring the heat from a low temperature side to a high temperature side.

The condenser 220 is commonly used in both of the refrigerating cycle 200 and the Rankine cycle 300. A first bypass passage 301 is provided between the gas-liquid separator 230 and a juncture A, which is an intermediate point between the condenser 220 and the expansion-compressor device 201, wherein the first bypass passage 301 bypasses the condenser 220. A second bypass passage 302 is provided between junctures B and C, wherein the juncture B is an intermediate point between the expansion-compressor device 201 and the check valve 252, whereas the juncture C is an intermediate point between the condenser 220 and the juncture A. The Rankine cycle 300 is formed in the following manner.

A liquid pump 310 is provided in the first bypass passage 301 for circulating the liquid phase refrigerant separated in the gas-liquid separator 230. The liquid pump 310 comprises an electrically driven pump, an operation of which is controlled by a control unit (not shown). A heating device 320 is provided between the juncture A and the expansion-compressor device 201.

The heating device 320 is a heat exchanger for heating the refrigerant by heat-exchange between the refrigerant supplied by the liquid pump 310 and engine cooling water (hot water) of an engine cooling circuit 20 (hot water circuit) for the engine 10. A three way valve 21 is provided in the hot water circuit for switching from a water circulation mode (to the heating device 320) to a water non-circulation mode, and vice versa, so that the hot water from the engine 10 is controlled to be supplied or not to be supplied to the heating device 320. A switching operation of the three way valve 21 is controlled by the control unit (not shown).

A water pump 22, which is for example a mechanical pump driven by the engine 10, is provided in the hot water circuit 20 for circulating the engine cooling water, and a radiator 23 is a heat exchanger for heat-exchanging the engine cooling water with the outside air for cooling down the engine cooling water. A numeral 24 designates a radiator bypass passage for bypassing the radiator 23, and a numeral 25 is a flow control valve for controlling a flow amount of the engine cooling water flowing through the radiator 23 and the flow amount of the engine cooling water flowing through the radiator bypass passage 24. A heater core 26 (also referred to as a heating apparatus) for the air conditioning system is provided in the hot water circuit 20, wherein the heater core heats the air by use of the engine cooling water as a heating source.

An operating cycle switching valve 110 is provided in the second bypass passage 302 at a connecting portion at the condenser side. The switching valve 110 is a valve for switching the operating cycle to one of the refrigerating cycle 200, the Rankine cycle 300 and the heat pump cycle 400, by opening either one of passages to the juncture A and the juncture B. A switching operation of the switching valve 110 is controlled by the control unit (not shown).

The Rankine cycle 300 is formed by the liquid pump 310, the first bypass passage 301, the heating device 320, the expansion device 330, the second bypass passage 302, the condenser 220, and so on, for generating the driving force at the expansion device 330 by collecting the waste heat from the engine 10.

The heat pump cycle 400 is formed by adding a liquid pump bypass passage 410 to the Rankine cycle 300.

The liquid pump bypass passage 410 bypasses the liquid pump 310, and an ON-OFF valve 411 for opening or closing the bypass passage 410 and an orifice 412 are provided in the liquid pump bypass passage 410. An opening area of the orifice 412 is set at a predetermined value. An operation of the ON-OFF valve 411 is controlled by the control unit (not shown). An accumulator 420 is provided between the juncture B and the compressor device 210, for separating the refrigerant in the cycle into the gas phase and the liquid phase refrigerant, to supply the gas phase refrigerant to the compressor device 210.

The heat pump cycle 400 is formed by the compressor device 210, the heating device 320, the liquid pump bypass passage 410, the orifice 412, the condenser 220, the accumulator 420, and so on. The condenser 220 operates as a heat exchanger in the heat pump cycle 400, for absorbing the heat from the outside, whereas the heating device 320 operates as a heat exchanger for heating the engine cooling water by the high pressure and high temperature refrigerant from the compressor device 210.

An operation of the first embodiment is explained with reference to FIGS. 2 to 5.

Figure 2:
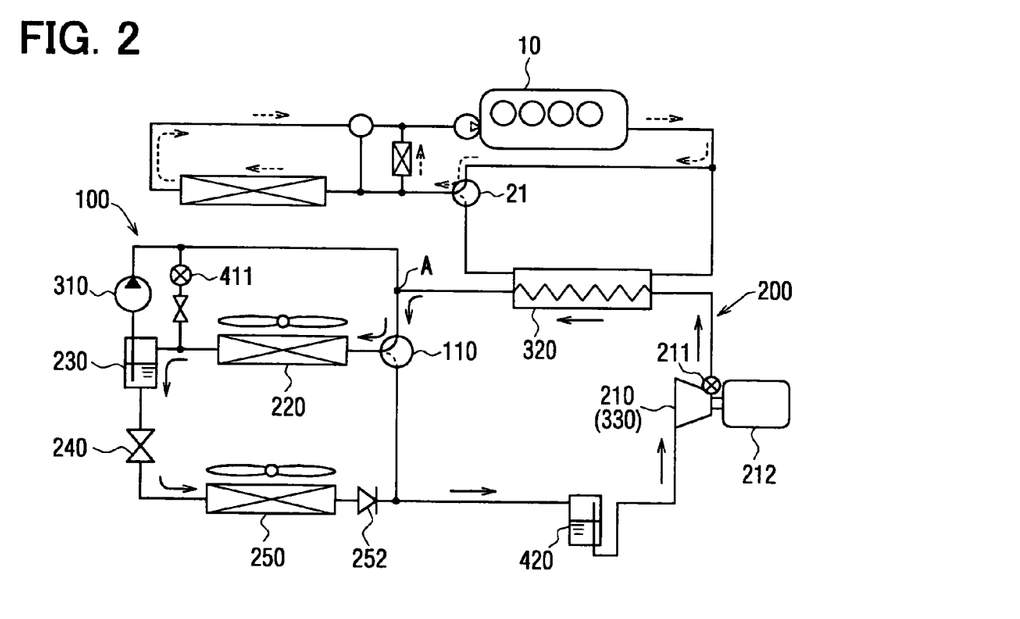
FIG. 2 is a schematic view showing the same system structure to FIG. 1, wherein flows of engine cooling water and refrigerant are indicated by arrows when the system is operating in a cooling mode.

(Cooling Mode: FIG. 2)

In the cooling mode, the refrigerating cycle 200 is operated, wherein the refrigerant is cooled down at the condenser 220, and the refrigerating performance is brought out at the evaporator 250, as shown in FIG. 2. According to the refrigerating cycle 200 of the embodiment, thermal energy (cooling energy) generated at the evaporator 250 is used for cooling operation and dehumidifying operation based on heat absorbing function, whereas thermal energy (heat energy) generated at the condenser 220 is not used for heating operation of the air conditioning system. The operation of the refrigerating cycle 200 in the heating operation is the same to that in the cooling operation and dehumidifying operation.

More specifically, the switching valve 110 is operated by the control unit (not shown) to communicate the condenser 220 with the juncture A, and the three way valve 21 is operated by the control unit so that the engine cooling water is prevented from flowing into the heating device 320, as indicated by arrows of a dotted line. The control valve 211 is switched to operate as the discharge valve, the operation of the liquid pump 310 is stopped, and the ON-OFF valve 411 is closed. Furthermore, the electric rotating device 212 is operated as the electric motor (the rotation in a forward direction), and the expansion-compressor device 201 is operated as the compressor device 210.

The refrigerant is circulated through the compressor device 210, the heating device 320, the switching valve 110, the condenser 220, the gas-liquid separator 230, the depressurizing device 240, the evaporator 250, the check valve 252, and the accumulator 420, as indicated by arrows of a solid line. Since the engine cooling water (hot water) is not circulated through the heating device 320, the heating device 320 is operated simply as a refrigerant passage in this operational mode.

The high pressure and high temperature refrigerant compressed at the compressor device 210 is cooled down at the condenser 220 by the outside air to be condensed, depressurized at the depressurizing device 240, and evaporated at the evaporator 250 to absorb the heat from the air which will be blown into the passenger room of the vehicle. The evaporated gas phase refrigerant is circulated again into the compressor device 210.

Figure 3:
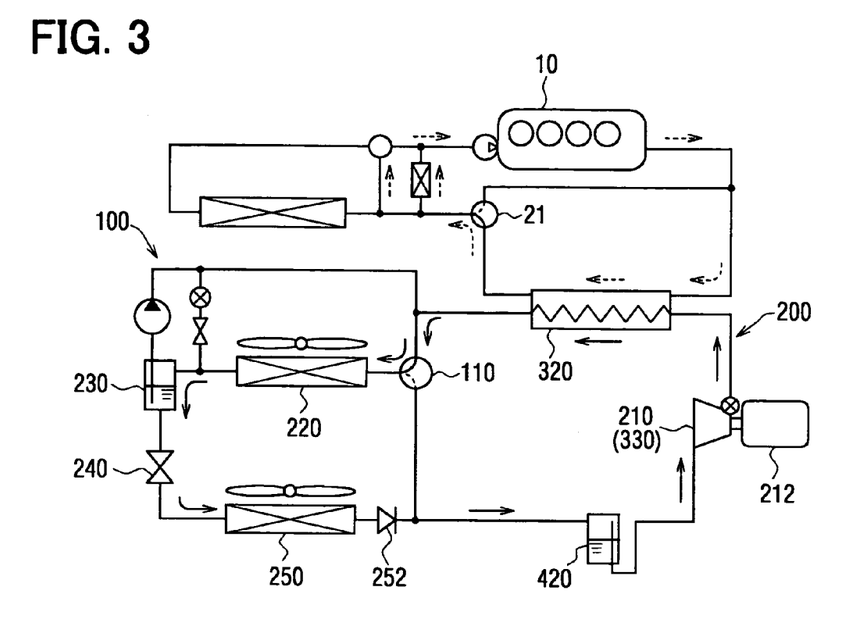
FIG. 3 is also a schematic view showing the same system structure to FIG. 1, wherein flows of engine cooling water and refrigerant are indicated by arrows when the system is operating in a cooling & heating mode.

(Cooling & Heating Mode: FIG. 3)

This is an operational mode, as shown in FIG. 3, in which the engine cooling water is actively heated, when the engine cooling water is at a low temperature, for example in a period shortly after the engine operation has been started, and when the cooling operation by the refrigerating cycle as described above is to be performed.

More specifically, the three way valve 21 is switched to a position, in which the engine cooling water is allowed to flow into the heating device 320, as indicated by arrows of the dotted line. The other conditions, such as the switching valve 110, the ON-OFF valve 411 and so on are the same to the cooling mode shown in FIG. 2.

In this operational mode, the temperature of the engine cooling water is lower than that of the high pressure and high temperature refrigerant compressed at the compressor device 210, the heat exchange is carried out at the heating device 320 between the engine cooling water and the refrigerant, and thereby the engine cooling water is heated. In other words, the refrigerant is cooled down at the heating device 320. As above, the heating device 320 is operated as the heat exchanger for radiating the heat from the refrigerant to the engine cooling water, in the cooling & heating mode.

Figure 4:
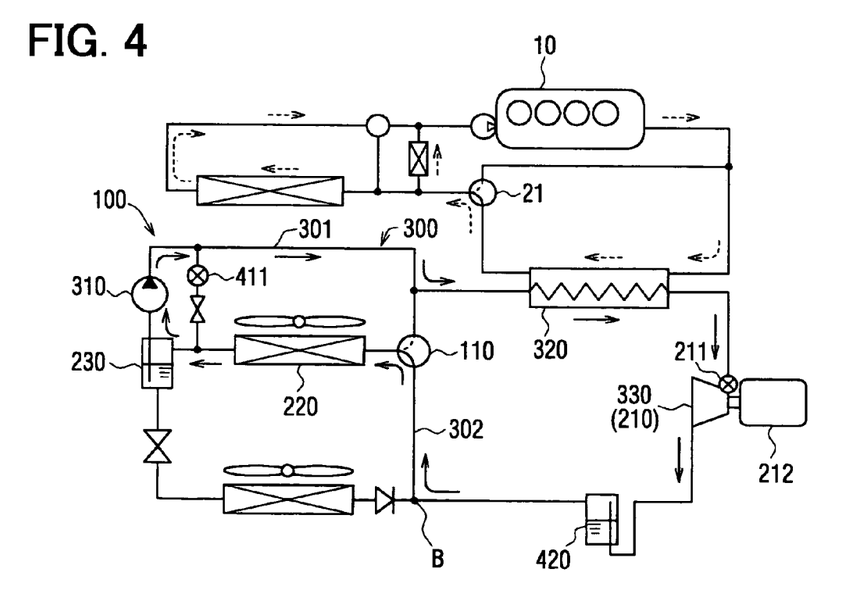
FIG. 4 is also a schematic view showing the same system structure to FIG. 1, wherein flows of engine cooling water and refrigerant are indicated by arrows when the system is operating in an electric power generating mode with Rankine cycle.

(Electric Power Generating Mode with Rankine Cycle: FIG. 4)

This is an operational mode, in which the Rankine cycle 300 is operated to collect energy from waste heat of the engine 10, so that the collected energy can be used for other components and devices.

More specifically, as shown in FIG. 4, the switching valve 110 is switched over by the control unit (not shown) to a position at which the condenser 220 is communicated with the juncture B (the second bypass passage 302), the three way valve 21 is switched to the position, in which the engine cooling water is allowed to flow into the heating device 320, as indicated by arrows of the dotted line. The control valve 211 is opened, the operation of the liquid pump 310 is started, and the ON-OFF valve 411 is closed. And the electric rotating device 212 is operated as the electric power generator.

In this operational mode, the refrigerant is circulated from the gas-liquid separator 230, the first bypass passage 301, the liquid pump 310, the heating device 320, the expansion device 330, the accumulator 420, the second bypass passage 302, the switching valve 110, and the condenser 220, as indicated by arrow of the solid line.

The superheated and vaporized refrigerant heated by the heating device 320 is supplied into the expansion device 330, and expanded in the expansion device 330 in the isentropic manner to decrease its enthalpy. As a result, mechanical energy corresponding to such decreased enthalpy is given by the expansion device 330 to the electric rotating device 212. Namely, the expansion device 330 is rotated by the expansion of the superheated refrigerant, to rotate the electric rotating device 212 (the electric power generator, the rotation of which is in the reversed direction). The electric power generated at the electric rotating device 212 is charged into a battery or a capacitor, or used for driving the other components and devices.

The refrigerant flowing out of the expansion device 330 is cooled down at the condenser 220 to be condensed, and is accumulated in the gas-liquid separator 230. The liquid phase refrigerant is supplied from the gas-liquid separator 230 to the heating device 320 by the operation of the liquid pump 310. The liquid pump 310 supplies the liquid phase refrigerant into the heating device 320 at such a pressure, at which the superheated refrigerant heated at the heating device 320 may not flow back toward the gas-liquid separator 230.

Figure 5:
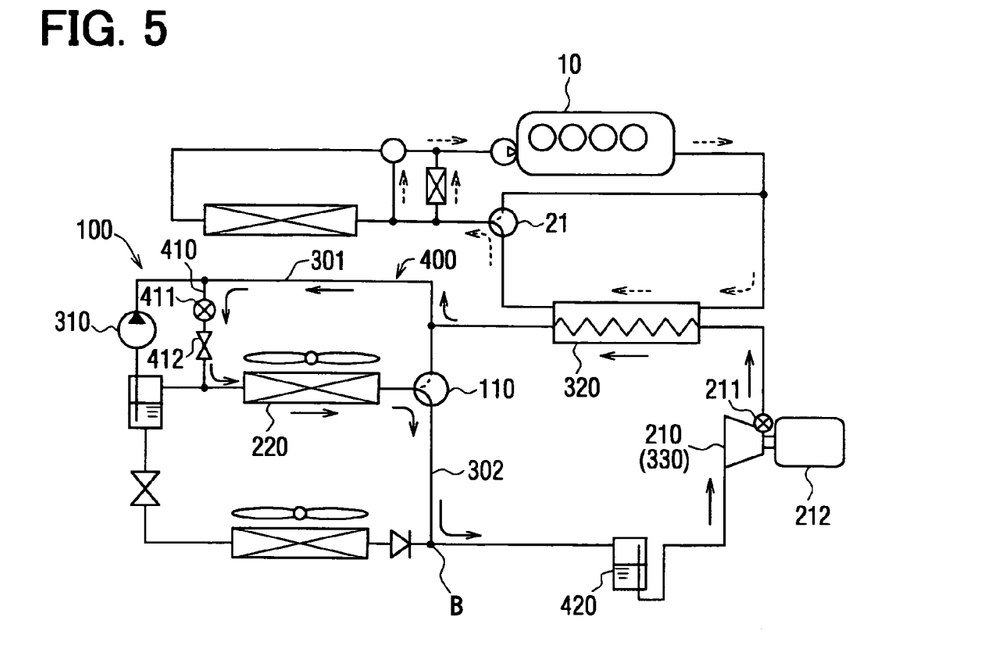
FIG. 5 is also a schematic view showing the same system structure to FIG. 1, wherein flows of engine cooling water and refrigerant are indicated by arrows when the system is operating in a heating mode with a heat pump cycle.

(Heating Mode with Heat Pump Cycle: FIG. 5)

This is an operational mode, in which the engine cooling water is actively heated by operating the heat pump cycle 400, when the engine cooling water is at a low temperature, for example in the period shortly after the engine operation has been started, and when the cooling operation by the refrigerating cycle is not required.

More specifically, as shown in FIG. 5, the switching valve 110 is switched over by the control unit (not shown) to the position at which the condenser 220 is communicated with the juncture B (the second bypass passage 302), and the three way valve 21 is switched to the position, in which the engine cooling water is allowed to flow into the heating device 320, as indicated by arrows of the dotted line. The control valve 211 is switched to a valve mode operating as the discharge valve, the operation of the liquid pump 310 is stopped, and the ON-OFF valve 411 is opened. And the electric rotating device 212 is operated as the electric motor (the rotation is in the forward direction), and the expansion-compressor device 201 is operated as the compressor device 210.

The refrigerant is circulated, in this operational mode, from the compressor 210, the heating device 320, the first bypass passage 301, the liquid pump bypass passage 410, the ON-OFF valve 411, the orifice 412, the condenser 220, the switching valve 110, the second bypass passage 302, and the accumulator 420, as indicated by arrows of the solid line.

As in the same manner to the above cooling & heating mode shown in FIG. 3, the heat exchange is performed at the heating device 320 between the refrigerant and the engine cooling water, so that the engine cooling water is heated. The refrigerant in the heat pump cycle is depressurized by the orifice 412, and evaporated at the condenser 220 by absorbing the heat from the outside air. The gas phase refrigerant evaporated at the condenser 220 is supplied into the accumulator 420, in which the refrigerant is separated into the gas phase and the liquid phase refrigerant, and the gas phase refrigerant is supplied again into the compressor device 210.

As above, in the heating mode with the heat pump cycle, the heating device 320 is operated as the heat exchanger for radiating the heat from the refrigerant to the engine cooling water, and the condenser 220 is operated as the heat exchanger for absorbing the heat from the outside air into the refrigerant.

According to the above embodiment, the Rankine cycle 300 is provided, in which the condenser 220 for the refrigerating cycle 200 is commonly used. As a result, the mechanical force can be collected by the expansion device 330 to generate the electric power, by operating the Rankine cycle 300 when the operation of the refrigerating cycle 200 is not required. The waste heat of the engine 10 can be thus effectively used. Otherwise the heat energy of the engine would be radiated to the ambient air through the radiator. As a consequence, the fuel consumption ratio can be improved.

Furthermore, according to the above embodiment, the heat pump cycle 400 is further provided to the Rankine cycle 300. Therefore, the engine cooling water can be heated through the heating device 320, by operating the heat pump cycle 400, when the operation of the refrigerating cycle is not required and the heat (the waste heat) generated at the engine is small. As a result, a performance of the engine warming-up operation can be improved. Furthermore, the shortage of the heating capacity at the heater core 26, which is operated by the engine cooling water as its heating source, can be compensated.

Furthermore, according to the above embodiment, the heating device 320 is provided in the refrigerant passage connecting the compressor device 210 with the condenser 220. Therefore, the high pressure and the high temperature refrigerant discharged from the compressor device 210 can be supplied to the heating device 320, when the refrigerating cycle 200 is in its operation and the heat generated at the engine 10 is small. Then, since the engine cooling water can be heated by the heating device 320, the performance of the engine warming-up operation can be improved. Furthermore, the shortage of the heating capacity at the heater core 26 can be likewise compensated.

Furthermore, the refrigerant flowing in the refrigerating cycle 200 is also cooled down by the heating device 320, in this heating mode with the heat pump cycle 400, in addition to the condenser 220 (which primarily operates to cool down the refrigerant). As a result, the pressure of the refrigerant can be reduced, and thereby the driving force necessary for the compressor device 210 can be accordingly decreased.

The compressor device 210 and the expansion device 330 are commonly formed as the expansion-compressor device 201, so that the fluid machine can be made smaller.

The accumulator 420 is provided at the suction side of the compressor device 210, and thereby the liquid phase refrigerant is prevented from being sucked into the compressor device 210 during the operation of the heat pump cycle 400, and the compression of the liquid phase refrigerant can be prevented.

Second Embodiment

Figure 6:
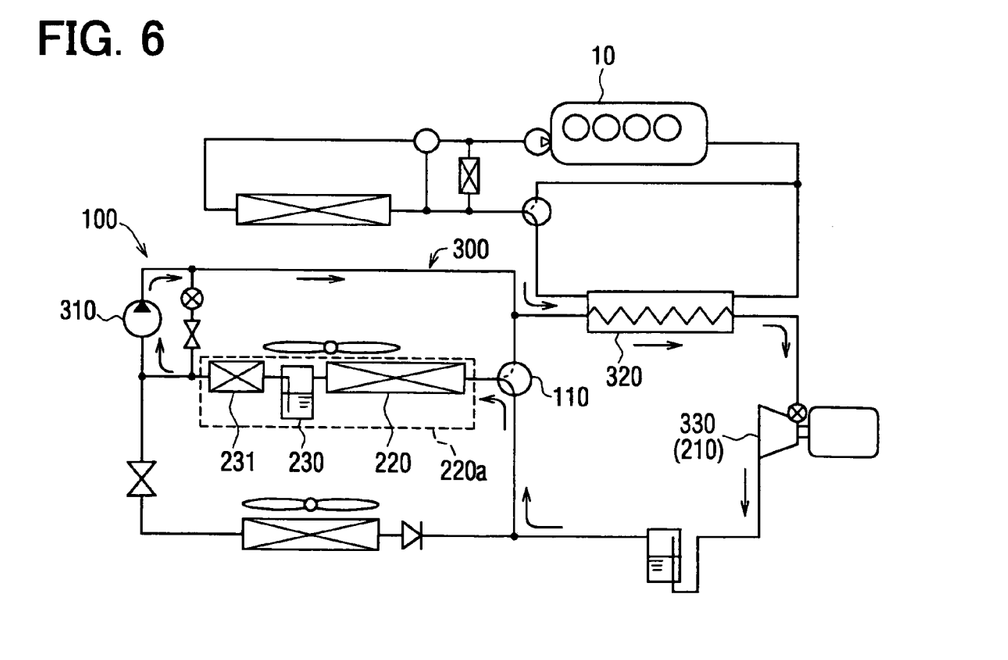
FIG. 6 is a schematic view showing a system structure of a vapor compression refrigerating apparatus according to a second embodiment of the present invention.

A second embodiment of the present invention is shown in FIG. 6, which differs from the first embodiment in that the condenser 220 is modified. More specifically, the condenser is formed as a sub-cool condenser device 220a, which comprises the (main) condenser 220, a gas-liquid separator 230, and a sub-cool condenser 231. The gas-liquid separator 230 and the sub-cool condenser 231 are arranged at a refrigerant outlet side of the condenser 220 in case of the operation of the Rankine cycle 300. The main condenser 220, the gas-liquid separator 230, and the sub-cool condenser 231 can be formed as an integrally constructed one unit.

According to the above structure of the second embodiment, the liquid phase refrigerant, which is discharged from the condenser 220 into the gas-liquid separator 230 and separated therein, can be further cooled down by the sub-cool condenser 231. Then, the refrigerant is supplied to the liquid pump 310. Accordingly, even when the pressure at the inlet side of the liquid pump 310 would be decreased (to a negative pressure), as a result that the liquid pump 310 sucks the refrigerant from the sub-cool condenser device 220a, the refrigerant can be prevented from being boiled and vaporized. Therefore, damage to the liquid pump 310 and a decrease of the pump efficiency, which may be caused by cavitation, can be prevented.

Figure 7:
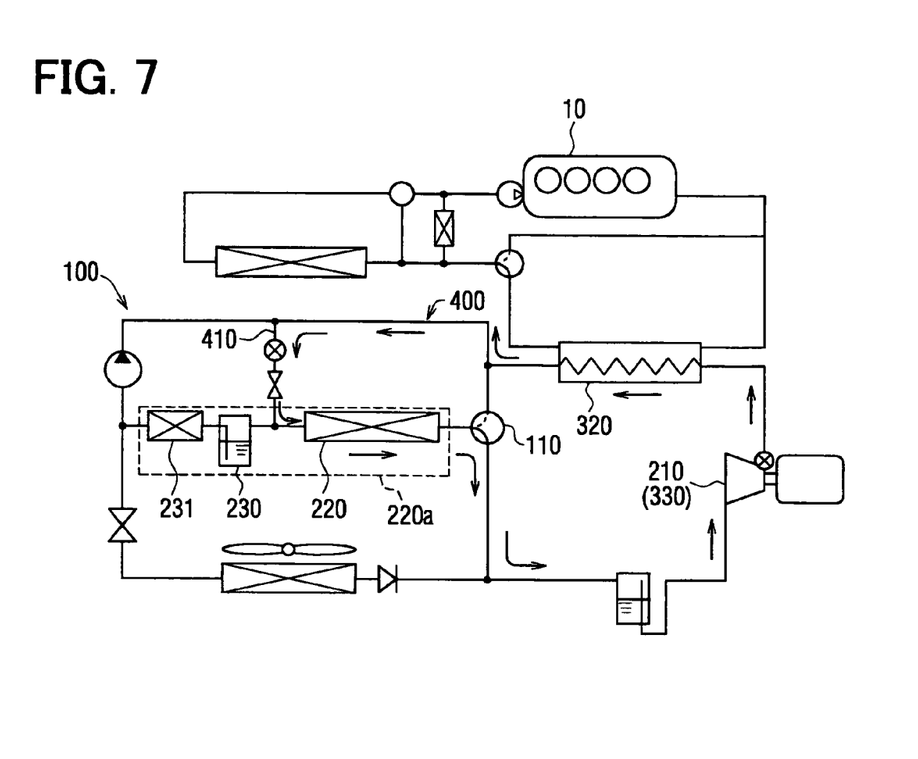
FIG. 7 is a schematic view showing a modified system structure of the second embodiment.

A modification of the second embodiment is shown in FIG. 7. In this modification, the liquid pump bypass passage 410 is connected at its one end with a refrigerant passage between the main condenser 220 and the gas-liquid separator 230, so that the refrigerant bypasses the sub-cool condenser 231 and the gas-liquid separator 230 and flows into the main condenser 220, when the system is operated in the heat pump cycle 400.

Accordingly, the refrigerant of the gas phase and the liquid phase from the heating device 320 does not flow into the sub-cool condenser 231, when the system is operated in the heat pump cycle 400. A volume of the sub-cool condenser 231 is generally designed to be a small value, and flow passage of the refrigerant therein is narrowed. When the gas phase refrigerant would flow into and through the sub-cool condenser 231, pressure loss would be generally increased. However, when the refrigerant is prevented from flowing through the sub-cool condenser 231, as in the above modification, the pressure loss in case of the operation of the heat pump cycle 400 can be reduced.

Third Embodiment

Figure 8:
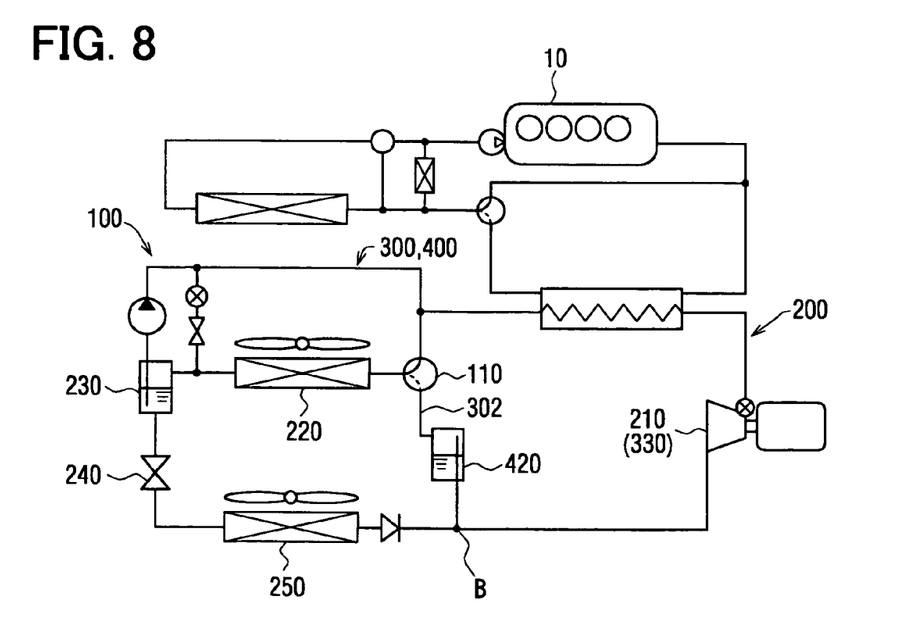
FIG. 8 is a schematic view showing a system structure of a vapor compression refrigerating apparatus according to a third embodiment of the present invention.

A third embodiment of the present invention is shown in FIG. 8, which differs from the first embodiment in a position of the accumulator 420.

According to the third embodiment, the accumulator 420 is arranged at such a position, which is out of refrigerant flow when the system is operated in the refrigerating cycle 200. More specifically, the accumulator 420 is arranged in the second bypass passage 302 between the switching valve 110 and the juncture B.

According to the above arrangement of the accumulator 420, the refrigerant does not flow through the accumulator 420 in case of the operation of the refrigerating cycle 200, and thereby the pressure loss can be likewise decreased.

Figure 9:
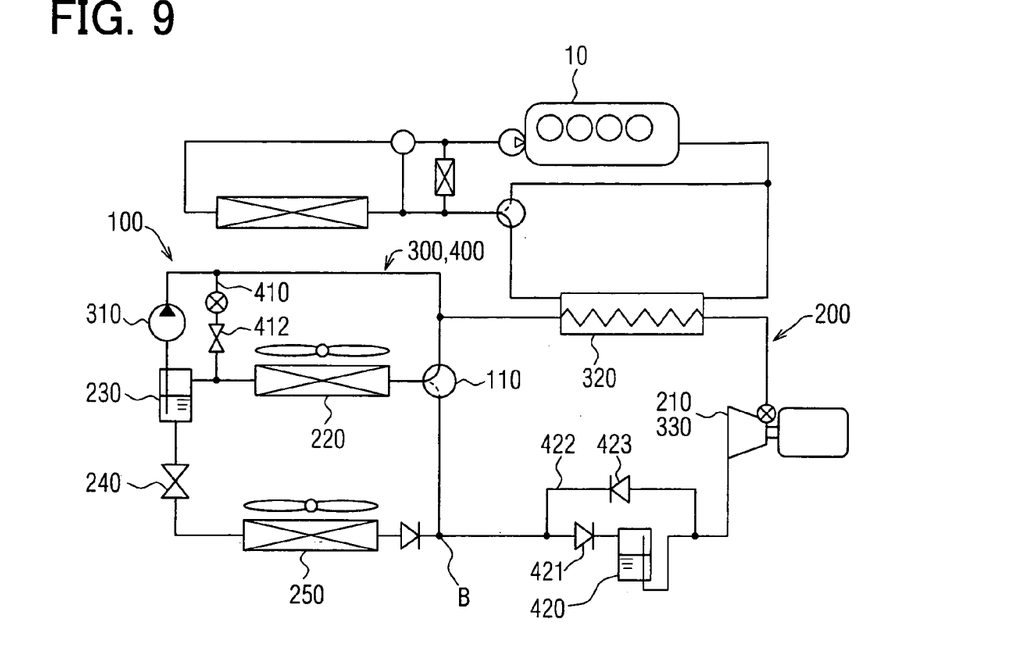
FIG. 9 is a schematic view showing a modified system structure of the third embodiment.

A modification of the third embodiment is shown in FIG. 9. An accumulator bypass passage 422 is provided in order to bypass the accumulator 420, when the system is operated with the Rankine cycle 300. A check valve 421 is provided to allow the refrigerant to flow from the juncture B to the accumulator 420, and a check valve 423 is provided in the bypass passage 422 so that the refrigerant from the compressor device 210 bypasses the accumulator 420 and flows to the juncture B.

According to the above structure, the refrigerant flows through the accumulator bypass passage 422 in case of the operation of the Rankine cycle 300, whereas the refrigerant flows through the accumulator 420 in case of the operation of the heat pump cycle 400. The accumulator 420 is not necessary for the Rankine cycle 300, and the pressure loss, which would occur if the refrigerant would flow through the accumulator 420 in the operation of the Rankine cycle 300, can be avoided.

Fourth Embodiment

Figure 10:
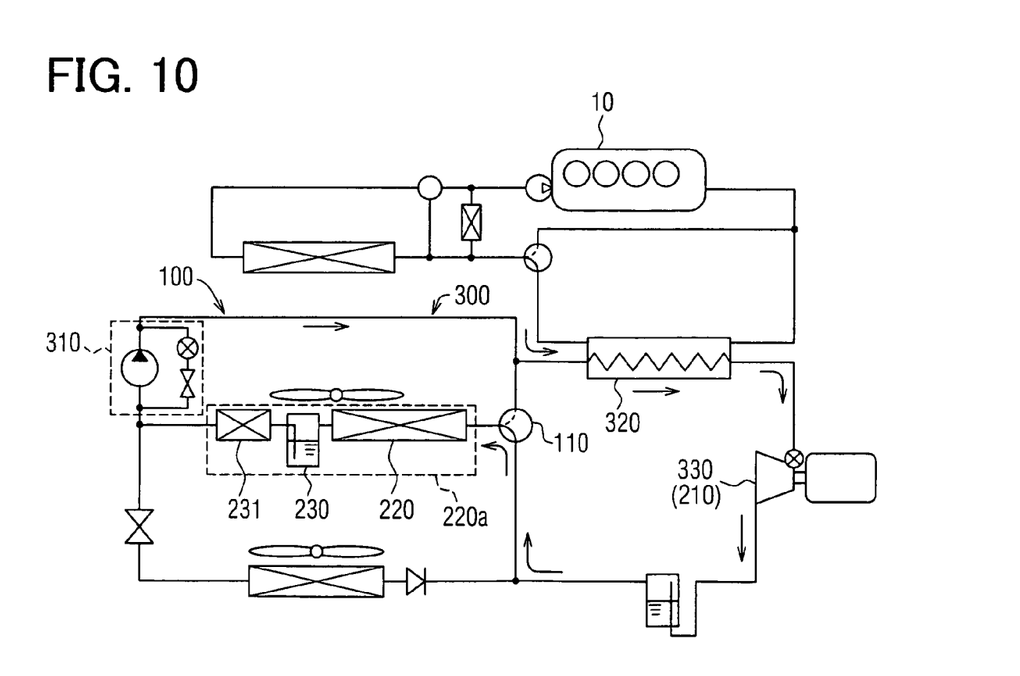
FIG. 10 is a schematic view similar to FIG. 6 but schematically illustrating the pump bypass integrally formed into the pump.

Referring to FIG. 10, the liquid pump bypass passage 410 can be integrally formed into the liquid pump 310, so that connecting pipes can be eliminated to make the system in a compact manner.

Other Embodiments

The engine 10 for the vehicle is explained, in the above embodiments, as the heat generating device. However, an external combustion engine, fuel cell stacks for a fuel cell vehicle, various electric motors, inverters, and so on, which would generate heat during their operation and throw away a part of the heat for controlling the temperature for itself (namely, generating waste heat), can be used as the heat generating device.

The heating device 320 can be arranged at a position which is out of the refrigerant passage between the compressor device 210 and the condenser 220, if the system is designed to primarily achieve the warming up operation for the engine 10 by the operation of the heat pump cycle 400. In such an arrangement, however, the warming up operation for the engine 10 becomes impossible, when the refrigerating cycle 200 is operated.

The compressor device 210 and the expansion device 330 can not be necessarily formed as one fluid machine, wherein some parts are commonly used for both operations. However, the compressor device and the expansion device can be, needless to say, separately formed as independent devices.

The switching valve 110 can be changed from the three way valve to an ON-OFF valve(s) for respectively opening and closing the refrigerant passages connected to the junctures A and B.

In the above embodiments, the electric rotating device 212 is driven by the force collected at the expansion device 330 to generate the electric power, and the generated electric power is charged into the battery. However, the collected energy can be converted into energy of movement to be charged in a flywheel, or into mechanical energy to be charged in a spring as an elastic potential energy.

What is claimed is:

1. A vapor compression refrigerating apparatus comprising:
a refrigerating cycle having a compressor device, a condenser device, a depressurizing device, and an evaporator, wherein refrigerant is circulated in the refrigerating cycle to perform a cooling operation;

a Rankine cycle having a pump for pumping out the refrigerant, a heating device for heating the refrigerant by use of waste heat from a heat generating device, an expansion device, and the condenser device, wherein the refrigerant is circulated in the Rankine cycle to generate a driving force at the expansion device by expansion of the refrigerant heated by the heating device; and a heat pump cycle having a pump bypass passage bypassing the pump, an orifice provided in the pump bypass passage and means for circulating the refrigerant from the compressor device through the heating device, the pump bypass passage and the condenser device such that a heat absorbing operation is performed at the condenser device and a heating operation is performed at the heating device, the heat generating device being heated by the heating operation at the heating device; wherein the refrigerant flowing from the heating device to the condenser device is depressurized and expanded in the pump bypass passage, and operation of the pump is stopped during operation of the heat pump cycle.

2. A vapor compression refrigerating apparatus according to claim 1, wherein, the heat generating device is a heat engine.

3. A vapor compression refrigerating apparatus according to claim 2, further comprising:

a heating apparatus which is heated by waste heat from the heat engine.

4. A vapor compression refrigerating apparatus according to claim 1, wherein, the heating device is provided in a refrigerant passage connecting the compressor device with the condenser device.

5. A vapor compression refrigerating apparatus according to claim 1, wherein, the compressor device is operated as the expansion device, when the superheated refrigerant discharged from the heating device is supplied to the compressor device.

6. A vapor compression refrigerating apparatus according to claim 1, wherein, the condenser device comprises;

a main condenser;

a gas-liquid separator connected to the main condenser and separating the refrigerant from the main condenser into gas phase and liquid phase refrigerant, when the Rankine cycle is in its operation; and a sub-cool condenser connected to the gas-liquid separator for further cooling down the liquid phase refrigerant from the gas-liquid separator.

7. A vapor compression refrigerating apparatus comprising:

a refrigerating cycle having a compressor device, a condenser device, a depressurizing device, and an evaporator, wherein refrigerant is circulated in the refrigerating cycle to perform a cooling operation;

a Rankine cycle having a pump for pumping out the refrigerant, a heating device for heating the refrigerant by use of waste heat from a heat generating device, an expansion device, and the condenser device, wherein the refrigerant is circulated in the Rankine cycle to generate a driving force at the expansion device by expansion of the refrigerant heated by the heating device; and a heat pump cycle having a pump bypass passage bypassing the pump and an orifice provided in the pump bypass passage, wherein the refrigerant is circulated from the compressor device through the heating device, the pump bypass passage and the condenser device to perform a heat absorbing operation at the condenser device and to perform a heating operation at the heating device, so that the heat generating device is heated by the heating operation at the heating device; wherein the condenser device comprises;

a main condenser;

a gas-liquid separator connected to the main condenser and separating the refrigerant from the main condenser into gas phase and liquid phase refrigerant, when the Rankine cycle is in its operation;

a sub-cool condenser connected to the gas-liquid separator for further cooling down the liquid phase refrigerant from the gas-liquid separator; and one end of the pump bypass passage is connected to a refrigerant passage between the main condenser and the sub-cool condenser, so that the refrigerant bypasses the sub-cool condenser and flows into the main condenser when the heat pump cycle is in its operation.

8. A vapor compression refrigerating apparatus according to claim 1, further comprising:

an accumulator provided in a refrigerant passage connecting the condenser device with the compressor device, and separating the refrigerant from the condenser device into the gas phase and liquid phase refrigerant to supply the gas phase refrigerant to the compressor device, when the heat pump cycle is in its operation.

9. A vapor compression refrigerating apparatus according to claim 8, wherein, the accumulator is provided at a position, which is out of a refrigerant passage formed in the operation of the refrigerating cycle, wherein the evaporator performs its cooling operation.

10. A vapor compression refrigerating apparatus according to claim 8, further comprising:

an accumulator bypass passage, so that the refrigerant flows through the accumulator bypass passage to bypass the accumulator, when the Rankine cycle is in its operation.

11. A vapor compression refrigerating apparatus comprising:

a refrigerating cycle having a compressor device, a condenser device, a depressurizing device, and an evaporator, wherein refrigerant is circulated in the refrigerating cycle to perform a cooling operation;

a Rankine cycle having a pump for pumping out the refrigerant, a heating device for heating the refrigerant by use of waste heat from a heat generating device, an expansion device, and the condenser device, wherein the refrigerant is circulated in the Rankine cycle to generate a driving force at the expansion device by expansion of the refrigerant heated by the heating device; and a heat pump cycle having a pump bypass passage bypassing the pump and an orifice provided in the pump bypass passage, wherein the refrigerant is circulated from the compressor device through the heating device, the pump bypass passage and the condenser device to perform a heat absorbing operation at the condenser device and to perform a heating operation at the heating device, so that the heat generating device is heated by the heating operation at the heating device; wherein the pump bypass passage is integrally formed into the pump.

* * * * *